United States Patent [19]

Bey

[11] 4,335,744
[45] Jun. 22, 1982

[54] QUIET SAFETY RELIEF VALVE

[75] Inventor: Roger Bey, Illzach, France

[73] Assignee: Control Components, Inc., Irvine, Calif.

[21] Appl. No.: 137,660

[22] Filed: Apr. 7, 1980

[51] Int. Cl.³ .................... F16K 31/122; F16K 15/00
[52] U.S. Cl. .................................. 137/522; 137/529;
138/42; 251/86; 251/127; 251/63.5
[58] Field of Search ............... 138/42, 43; 137/625.28,
137/625.3, 529; 251/62, 86, 87, 84, 63.5, 63.6,
127

[56] References Cited

U.S. PATENT DOCUMENTS

| 73,602 | 1/1868 | Hendrick | 251/86 |
|---|---|---|---|
| 1,799,667 | 4/1931 | Ziegler | 251/87 |
| 2,675,204 | 4/1954 | Johnson | 251/62 |
| 2,759,699 | 8/1956 | Rush | 251/63.5 |
| 3,141,474 | 7/1964 | Gentzel | 251/86 |
| 3,331,583 | 7/1967 | Baker | 251/63.5 |
| 3,347,286 | 10/1967 | Smith | 251/62 |
| 3,379,405 | 4/1968 | Natho | 251/63.6 |
| 3,688,800 | 9/1972 | Hayner et al. | 138/42 |
| 3,780,767 | 12/1973 | Borg et al. | 251/127 |
| 3,838,707 | 10/1974 | Wachowitz, Jr. | 251/63.5 |

FOREIGN PATENT DOCUMENTS

| 965099 | 3/1957 | Fed. Rep. of Germany | 251/63.5 |
|---|---|---|---|
| 2241550 | 3/1974 | Fed. Rep. of Germany | 251/63.5 |
| 60182 | 3/1912 | Switzerland | 251/63.5 |

Primary Examiner—George L. Walton
Attorney, Agent, or Firm—Robert J. Edwards

[57] ABSTRACT

A relief valve (10) having both spring biasing means (116) and air pressure biasing means (114). The spring biasing means (116) includes a plurality of spring washers (132) acting between the valve body (12) and a valve member (74). The air biasing means (116) includes an air cylinder defined by an intermediate portion (20) of the valve body (12), and a piston (118) disposed within the cylinder and acting on the valve member (74). An air inlet port (48) is provided above the piston (118) to permit the area above the piston (118) to be pressurized to add to the biasing force of the spring biasing means (116), and an air inlet port (52) is provided below the piston (118) to permit the area below the piston (118) to be pressurized to open the valve manually for testing and exercising. A "quiet" element (102) surrounds the valve member (74) to reduce the sound level of the fluid flowing through the valve when the valve opens.

9 Claims, 3 Drawing Figures

QUIET SAFETY RELIEF VALVE

TECHNICAL FIELD

The present invention relates generally to relief valves, and more particularly to a quiet relief valve which includes both spring and air biasing means.

BACKGROUND ART

Spring loaded relief valves are well known in the art. While such valves are generally reliable and fail-safe in nature, it is not convenient to provide such valves with external means to open the valve in order to exercise and/or test the valve. While an air or other form of pressure-biased valve can be readily provided with external actuating means, such a valve will not remain operational as a relief valve in the event of a loss of biasing pressure.

Because of the inherent problems associated with the prior art relief valves, it has become desirable to develop a valve which is operable as a relief valve independent of pressure or other external biasing forces, which is fail-safe, and which can be opened by external means for exercising and testing the valve.

SUMMARY OF THE INVENTION

The present invention solves the aforementioned problems associated with the prior art as well as other problems by providing a relief valve which is biased by both spring and air pressure means, and wherein the air biasing means includes means for applying air pressure to the valve opposite to the biasing direction and against the spring biasing means to open the valve for exercising and testing purposes. In the event of a loss of air pressure, the spring biasing means is still effective to bias the valve into the closed condition. The relief valve includes a housing, inlet means, outlet means, a valve element, and a biasing assembly which normally biases the valve element closed with a predetermined closing force such that the valve element will open a flow path from the inlet means to the outlet means when the closing force is exceeded by an oppositely directed pressure force. The biasing force is applied to the stem member to which it is attached by means of an air cylinder formed integrally with the valve body, and by a plurality of spring members acting between the valve body and the stem. The air cylinder is divided into an upper and a lower chamber by a piston member operatively attached to the valve stem, and air inlet ports are provided to the two chambers for supplying biasing pressure to the valve to bias the valve closed in combination with the spring biasing means, and for supplying an opening pressure to the valve, against the spring biasing force. If air pressure is lost the valve will remain biased closed by the spring force, however, it can be appreciated that the valve will relieve at a lower pressure than if it were biased closed by both spring and air pressure.

In accordance with the invention, the valve also includes a "quiet" element surrounding the valve element to reduce the noise level when the valve is relieving excess pressure.

DETAILED DESCRIPTION OF THE PREFERRED EMBODIMENT

Figure 1:
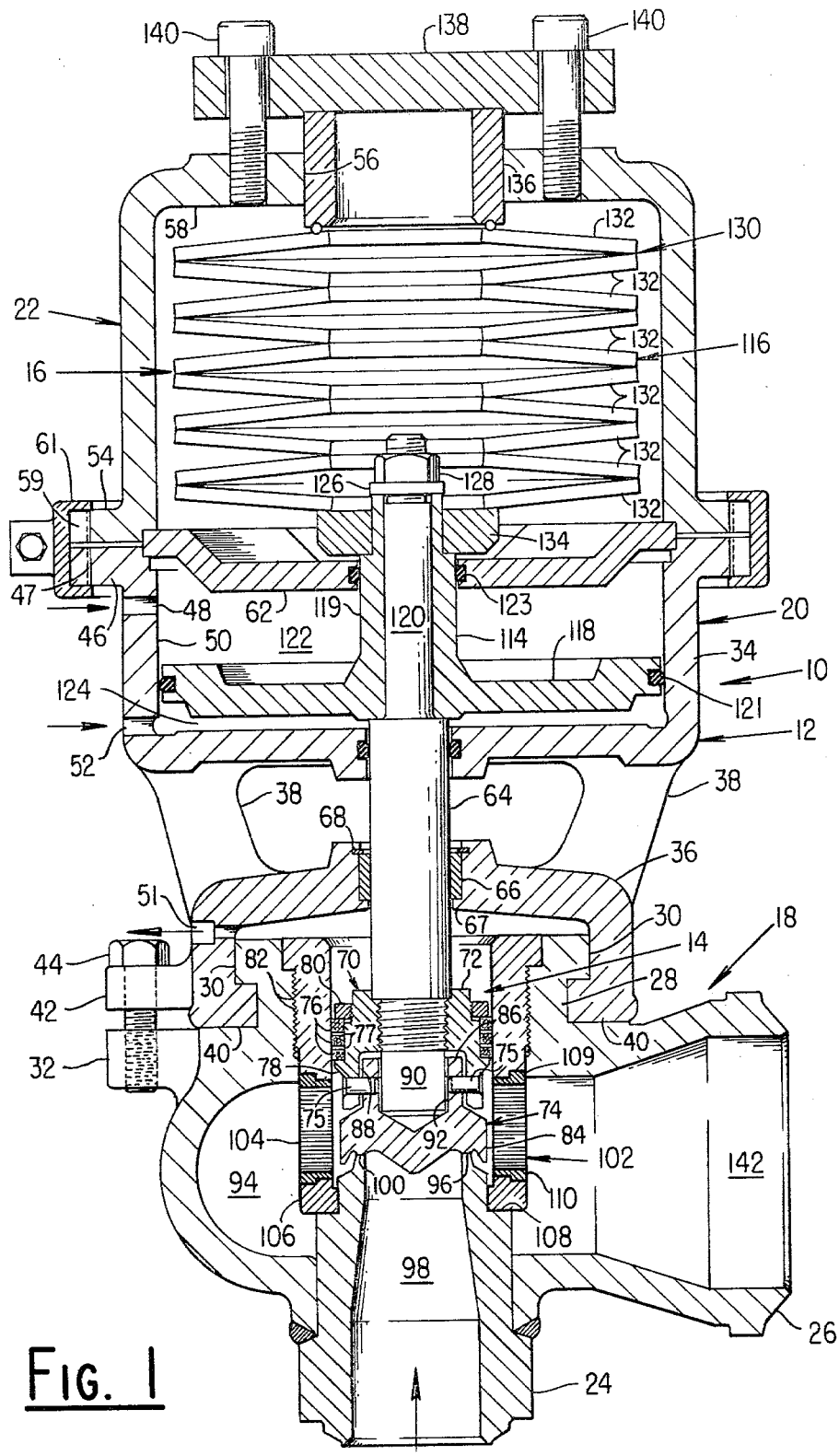
FIG. 1 is a cross-sectional view of a relief valve constructed in accordance with the invention.

Referring now to the drawings where the illustrations are for the purpose of describing the preferred embodiment of the invention and are not intended to limit the invention hereto, FIG. 1 illustrates a safety relief valve 10 comprising a body assembly 2, a valve assembly 14 received with the body assembly 12, and a biasing assembly 16 also received with the body assembly.

The body assembly 12 comprises a lower section 18, an intermediate section 20 attached to the lower section, and an upper section 22 attached to the intermediate section.

The lower section 18 of the body assembly 12 includes an inlet portion 24, which can be a separate piece welded or otherwise attached to the lower end of the lower section 18, an outlet portion 26, and a valve element receiving portion 28. The upper end of the lower section 18 includes spaced, outwardly directed radial lugs 30 through which the intermediate section 20 and the lower section 18 are maintained together vertically, and a plurality of flange sections 32 (only one of which is shown) which receive bolts locking the sections together as will be hereinafter described.

The intermediate section 20 of the body assembly 12 comprises a cast body including an upper, upwardly opening cup-like portion 34; a lower, downwardly opening cup-like portion 36; and a plurality of webs 38 which connect the upper and lower cup-like portions. The lower, cup-like portion 36 includes spaced, radially inwardly directed lugs 40, which are interengageable with the lugs 30 on the lower section 18 when the lower and intermediate sections are brought together and turned relative to one another so that the lugs coincide. The intermediate section 20 also includes a plurality of flange sections 42 (only one of which is shown), which are aligned with the flange sections 32 when the lugs 30,40 are interengaged, so that bolts 44 received through the flange sections 42 and threaded into the flange sections 32 will lock the lower and intermediate sections together.

The upper cup-like portion 34 of the intermediate section 20 includes an outwardly directed radial lip or flange 46 which has a plurality of splines 47 formed on the outer end thereof for attachment to the upper section 22 as will be hereinafter described. A first air inlet port 48 is formed in the side wall 50 of the cup-like portion 34 adjacent the flange 46. A second air inlet port 52 is also formed in the side wall 50 adjacent the lower edge thereof. A vent port 51 is formed through the side of the lower cup-like portion 36 of the intermediate section 20.

The upper section 22 of the body assembly 12 is an inverted bowl-shaped member having an outwardly extending flange 54 formed at the lower end thereof, and having a central bore 56 formed in the bore 58 thereof. A plurality of splines 59 are formed on the outer edge of flange 54 and are alignable with the splines 47 formed in the flange 46. A ring clamp 61, having a plurality of internal splines formed therein can be placed over the flanges 46 and 54 as shown, to clamp the upper section 22 and the intermediate section 20 together, while positively preventing relative rotation therebetween. Prior to assembling the upper and intermediate sections, an air chamber wall member 62 is inserted, as shown, between the upper and intermediate sections, and is retained by the ring clamp 61.

The valve assembly 14 comprises a valve stem 64 slidingly received within a bearing 66 retained in the lower cup-like portion 36 of the intermediate section 20 between a shoulder 67 formed therein and a retaining ring 68, and a valve element assembly 70 threadably attached to the valve stem 64 adjacent the lower end thereof.

The valve element assembly 70 comprises a seal member 72 threadably attached to the valve stem 64, and a valve member 74 which is attached to the seal member by pins 75. A plurality of resilient seal elements 76 separated by spacers 77 are received over a reduced diameter portion of the seal member 72, and are retained axially between a shoulder 78 formed on the seal member, and a ring 80 which is threaded onto the seal member.

The seal elements 76 slidingly engage the inside diameter of a cylindrical insert 82 which is threaded into the lower section 18 of the body assembly 12. The insert 82 is preferably of hardened steel to define a durable wearing surface for the seal elements 76.

The valve member 74 includes a relatively large diameter portion 84, and a relatively smaller diameter portion 86. The outer diameter of the smaller diameter portion 86 fits within a counterbore 88 formed in the bottom portion of the seal member 72, and the lower end 90 of the valve stem 64 is received within a counterbore 92 formed in the top portion of the valve member 74. The pins 75 are received through the annular walls defined between the respective outer diameters and counterbores of the valve member 74 and the seal member 72.

The inlet portion 24 of the lower section 18 of the body assembly 12 extends upwardly into an outlet chamber 94 formed within the outlet portion 26 of the valve, and has a valve seat 96 formed at the upper end thereof where an inlet passage 98 formed through the inlet portion 24 opens into the outlet chamber 94. The bottom surface of the valve member 74 has an annular sealing face 100 formed thereon which contacts the valve seat 96 when the valve is in the closed position, as shown in FIG. 1.

A so-called "quiet" valve element 102 is received within the outlet chamber 94 in surrounding relationship with the valve member 74. The quiet element essentially comprises a plurality of annular rings 104 stacked between the bottom face of the insert 82 and a lower ring 106 which is received against a shoulder 108 formed on the inlet portion 24. The stack of rings 104 is received between stepped upper and lower washers 109 and 110 which interfit with complementary stepped portions formed on the insert 82 and the lower ring 106, and is retained by threading the insert 82 into the lower section 18 of the body assembly 12 to clamp the stack between the insert 82 and the inlet portion 24.

Figure 2:
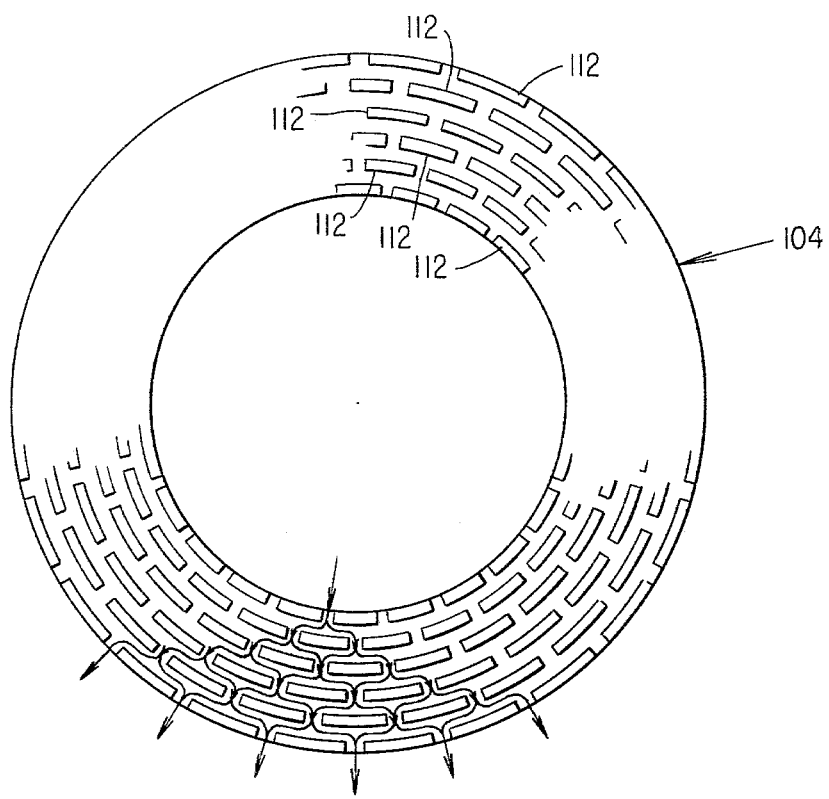
FIG. 2 is a plan view of one of the disks of the quiet valve element incorporated in the invention.
Figure 3:
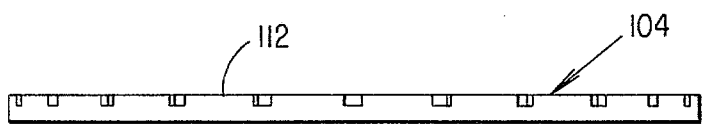
FIG. 3 is an elevation view of the disk of FIG. 2.

A "quiet" valve element such as the stack of rings 104 is well known in the art, and one of several known types can be used, however, in the preferred embodiment illustrated in FIG. 2, each of the rings comprises an annular plate having a plurality of spaced apart wall segments 112 upstanding from the plate surface and arranged in concentric rings with the wall segments alternating. When the stack of rings 104 is formed as shown in FIG. 1, fluid passing through the valve flows from the center outwardly into chamber 94 and must follow a circuitous path around the wall segments 112 as indicated by the arrows on FIG. 2. In this manner the "quiet" valve element acts as a muffler to reduce the noise level of the flow of fluid through the valve.

The biasing assembly 16 comprises an air biasing assembly 114 and a spring biasing assembly 116, both operatively acting on the valve stem 64 to bias the valve into its closed position, as shown in FIG. 1.

The air biasing assembly 114 comprises a piston 118 having a hub portion 119 received over a reduced diameter portion 120 of the valve stem 64, and a seal element 121 received in an annular groove formed in the outer diameter of the piston 118 and acting against the inside diameter of the upper cup-like portion 34 of the intermediate section 20. The hub 119 extends through an aperture formed in the wall member 62 and is sealed by an O-ring 123. The piston 118 divides the volume within the upper cup-like portion 34 and bounded by the wall member 62 into an upper chamber 122 and a lower chamber 124. The air inlet port 48 opens into the upper chamber 122, and the air inlet port 52 opens into the lower chamber 124. The piston 118 is received on the valve stem 64 against a shoulder defined by the intersection of the reduced diameter portion 120 and the main body of the stem 64, and is retained thereon by a washer 126 and a nut 128 threaded onto the end of the stem 64.

The spring biasing assembly 116 comprises a spring element 130 acting between the upper section 22 of the body assembly 12 and the valve stem 64. In the embodiment illustrated in FIG. 1, the spring element 130 comprises a plurality of spring washers 132 stacked together in pairs and positioned between a thrust washer 134 received on the upper end of the hub portion 119 of the piston 118 and a cylindrical sleeve 136 received through the central bore 56 in the bore 58 of the upper section 22 and retained by a cover plate 138 which bears against the sleeve. The cover plate 138 is retained relative to the upper section 22 by bolts 140 received through the cover plate and threaded into the bore 58. The biasing force of the spring element 130 can be controlled by the extent to which the bolts 140 are threaded into the upper section 22.

OPERATION

In operation, the spring biasing assembly 116 is adjusted by means of the bolts 140 to obtain a predetermined spring force biasing the valve member 74 into its closed position. Air pressure is then introduced into the upper chamber 122 through the air inlet port 48 to act on the upper surface of the piston 118 to add an additional biasing force to the valve member 74. Thus, the total force holding the valve closed is the combined spring force plus the pressure force applied by the piston 118.

When the valve is to be tested or exercised, air pressure is introduced into the lower chamber 124 through the air inlet port 52 to act on the underside of the piston 118 to apply an opening force, against the biasing force, to the valve member 74. Depending on the conditions under which the valve is to be tested or exercised, air pressure can continue to be applied to the air inlet port 48, in which case both the spring and air pressure biasing forces must be overcome to open the valve. Alternatively, air to air inlet port 48 can be discontinued, in which case only the spring biasing force must be overcome.

When the biasing force is overcome, either by an overpressure condition during normal operation, or during testing or exercising, the valve member 74 will lift off the valve seat 96, opening a flow path from the inlet passage 98, through the "quiet" valve element 102 into the outlet chamber 94, and out through an outlet passage 142 formed in the outlet portion 26, the "quiet" element acting to minimize the noise level of the escaping fluid. When the valve member 74 opens, the vent port 51 prevents a build-up of pressure above the valve member.

If there should be a loss of air pressure, resulting in the loss of the pressure biasing force, the valve will remain operational, but will relieve at a lower pressure represented by the spring biasing force only.

Certain modifications and improvements will occur to those skilled in the art upon reading the foregoing description. It will be understood that all such improvements and modifications have been deleted herein for the sake of conciseness and readability but are properly within the scope of the following claims.

I claim:

1. In a relief valve including a body, inlet means formed in said body, outlet means formed in said body, a valve assembly between said inlet and outlet means and movable between a closed position and an open position, means for moving said valve assembly between the closed and open position, and means biasing said valve assembly to its closed position; the improvement wherein said means biasing said valve assembly comprises the combination of spring means acting between said body and said valve assembly, first fluid pressure means acting on said valve assembly, the net biasing force acting on the valve being the spring force plus the first fluid pressure force, wherein said means for moving said valve assembly includes second fluid pressure means acting on said valve assembly to move said valve assembly to its open position, wherein said valve assembly comprises a valve stem received for axial sliding movement in said body, and a sealing element attached to an end of said valve stem, including a piston element attached to said valve stem, wherein said body comprises a lower section, an intermediate section attached to said lower section, and an upper section attached to said intermediate section, a portion of said intermediate section defining a cylinder in which said piston element is received, including a wall member received between said intermediate section and said upper section and substantially closing one end of said cylinder, a first fluid inlet port formed in said intermediate section and opening into said cylinder on a first side of said piston element, and a second fluid inlet port formed in said intermediate section and opening into said cylinder on a second side of said piston element; and, wherein said piston element comprises a hub portion received on said valve stem and extending through said wall member, and a disk portion including peripheral sealing means acting against the interior wall of said cylinder.

2. The apparatus as defined in claim 1, wherein said spring means acts between said upper section of said body and said hub portion of said piston element.

3. The apparatus as defined in claim 2, wherein said spring means comprises a plurality of spring washers arranged in pairs stacked together in a back-to-back relationship.

4. The apparatus as defined in claim 3, including a tubular sleeve positioned coaxially with said valve stem and slidingly received in an aperture formed in said upper section, one end of said tubular sleeve being in contact with said spring means, a plate disposed above said upper section and in contact with the opposite end of said tubular sleeve, and a plurality of fasteners received through said plate and threaded into said upper section, the preload on said spring means being controlled by the extent to which said fasteners are threaded into said upper section.

5. The apparatus as defined in claim 1, including a quiet valve element surrounding said valve assembly, whereby fluid passing from said inlet means to said outlet means passes through said quiet valve element.

6. The apparatus as defined in claim 5, wherein said quiet valve element comprises a plurality of stacked disks, each disk having a plurality of spaced concentric rings of alternately spaced apart upstanding wall elements formed thereon.

7. The apparatus as defined in claim 1, wherein said valve assembly comprises a valve stem slidingly received in said body, a first cylindrical element attached to said valve stem adjacent one end thereof, and a second cylindrical element slidingly received over said end of said valve stem, and means pinning said first cylindrical element and said second cylindrical element together, said second cylindrical element including a valve seat surface formed thereon.

8. The apparatus as defined in claim 7, including a cylindrical sleeve received in said body in a surrounding relationship to said valve assembly, said first cylindrical element including annular sealing elements received thereon and acting between said first cylindrical element and said cylindrical sleeve.

9. The apparatus as defined in claim 7, wherein said first cylindrical element includes a first axial bore which is threaded for engagement with a threaded portion of said valve stem adjacent the end thereof, and an enlarged coaxial counterbore; said second cylindrical element includes an annular wall portion received over said end of said valve stem and within said enlarged coaxial counterbore, said means pinning said cylindrical elements comprising pins received through the wall of the counterbored portion of said first cylindrical element and through said annular wall of said second cylindrical element.

* * * * *